CHARLES F. CHAMBERS.
Improvement in Plows.
No. 115,701.  Patented June 6, 1871.
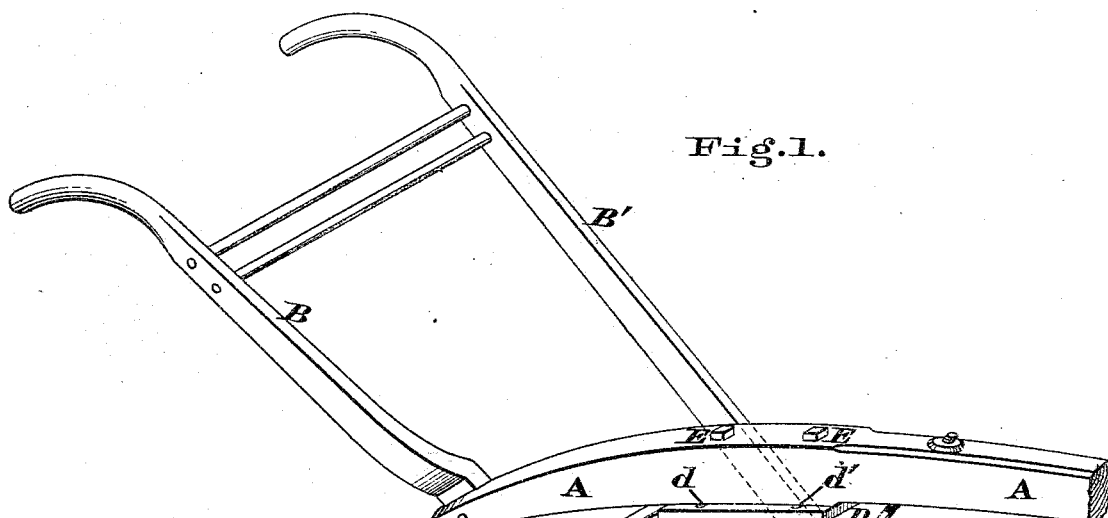
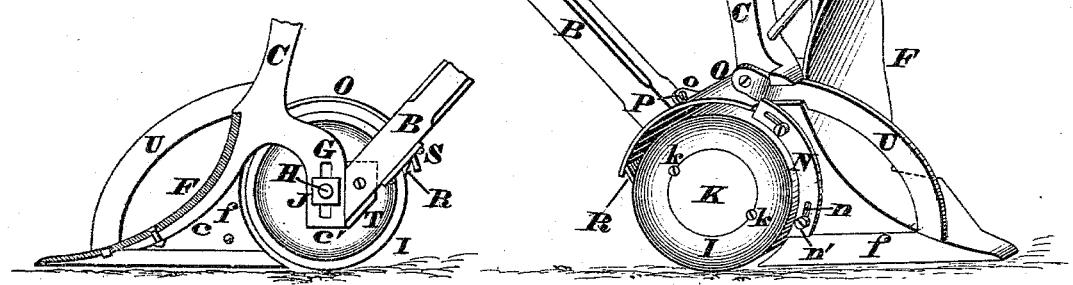
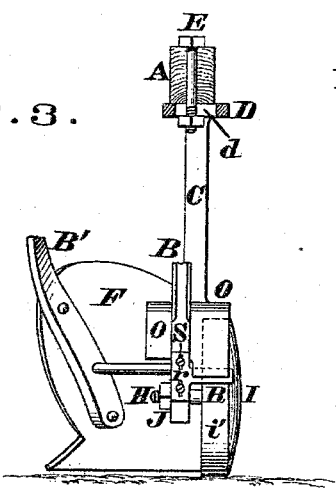
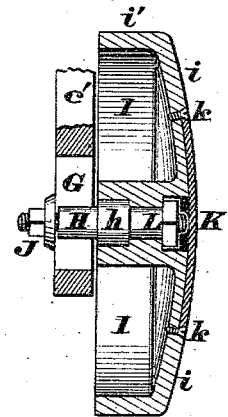

UNITED STATES PATENT OFFICE.

CHARLES F. CHAMBERS, OF HUTSONVILLE, ILLINOIS.

IMPROVEMENT IN PLOWS.

Specification forming part of Letters Patent No. 115,701, dated June 6, 1871.

I, CHARLES F. CHAMBERS, of Hutsonville, Crawford county, State of Illinois, have invented certain new and useful Improvements in Plows, of which the following is a specification.

Nature and Objects of the Invention.

This invention relates to that class of plows which has a wheel in the rear of the land side of the share. In my implement said wheel is made adjustable in a vertical plane for a purpose which will be hereafter fully explained. My plow is further provided with the following devices, to wit: One or more guards for the purpose of preventing dirt accumulating between the wheel and the plow-share, said guards being adjustable so as to correspond with the varying positions of the wheel.

Description of the Accompanying Drawing.

Figure 1 is a perspective view of a plow embodying my improvements, a portion of the beam being broken off. Fig. 2 is a longitudinal section through the share and its accessories. Fig. 3 is a rear elevation of the implement with the beam shown in section and the handles broken off; and Fig. 4 is a vertical section of the wheel on an enlarged scale.

General Description.

A represents a plow-beam, having the customary handles B B' and sheth C, which latter is made of iron, and terminates at the top in a plate, D, having transverse slots $d$ $d'$ for the reception of bolts E, with which said sheth is attached to the beam. The lower end of the sheth is forked, and terminates in two branches, C C', the former of which has secured to it the plow-share F, while the latter is slotted at G for the reception of the shaft H of wheel I, the shaft being secured in the slot by a nut, J. The land-side of the wheel I is crowning, as shown at $i$ in Fig. 4, and it is provided with a central disk, K, the removal of which gives access to the nut L, with which the wheel is secured to shaft H. The nut L prevents the wheel from being drawn away from the sheth C', while a collar, $h$, upon the shaft, prevents the wheel crowding against said part $c'$ of the sheth. Attached to the land-side $f$ of the share is a segmental guard-plate, N, which prevents dirt entering between the share and the wheel, and said plate is rendered capable of being adjusted so as to suit the various positions of said wheel by means of slots $n$ and screws or bolts $n'$. The top of the wheel is protected by a curved guard-plate, O, which has lugs $o$ and screws P, by which it is adjusted toward or away from the wheel I. Q is a scraper, which, pressing upon the periphery of wheel I, keeps it free of dirt, and this scraper can be adjusted by means of slots $r$ and screws S. Projecting rearwardly from portion C' of the sheth is a flange, T, to which the lower end of handle B is bolted. Attached to the share, and also to the sheth of the implement, is a curved colter, U, which acts to cut the earth before the share comes into action. In order to render the wheel I as light as possible and at the same time to give it sufficient bearing-surface upon the ground so as not to penetrate the latter, it is provided with an inwardly-projecting flange or tread, $i'$. The disk K is secured to the wheel by screws $k$, whose heads should be countersunk, as shown in Fig. 4.

The wheel I relieves the land-side bar of the greater part of the stress which is usually imposed upon it, and obviates the necessity of "laying" said bar with steel, as now customary in good plows. Whenever the bar becomes worn the wheel can be adjusted so as to compensate for it, and also to level the plow. The wheel, being swelled or convex on its exposed or land-side enables the land-side plate to advance with less friction against the earth than would otherwise be done. The slotted plate D enables the beam to be adjusted in such a manner as to cause the plow to give or take land, and it also permits of the implement being used in any kind of soil.

In case it is desired to throw a slice of sod completely over, it can be accomplished in the most effective manner by simply lowering the wheel I; but if the plow is turning too big a slice or too much, it can be remedied by elevating said wheel.

This implement accomplishes the same result as the three separate plows which are commonly used for sod, stubble, or medium work.

My improvements can be applied to any ordinary bar-plow with very little difficulty or expense.

Claims.

1. The combination of the forked and slotted sheth C c c' G, share F f, shaft H provided with a collar, h, nuts J L, and convex wheel I i i', as and for the purpose set forth.

2. In combination with the handle B, sheth C, and adjustable wheel I, the adjustable guards N n n' and O o l, as and for the purpose set forth.

In testimony of which invention I hereunto set my hand.

C. F. CHAMBERS.

Witnesses:
GEO. H. KNIGHT,
J. B. FORAKER.